US009877240B1

(12) United States Patent
Saleh (10) Patent No.: US 9,877,240 B1
(45) Date of Patent: Jan. 23, 2018

(54) METHOD AND APPARATUS FOR LATENCY-BASED SELECTION OF SERVING BASE STATION

(71) Applicant: Sprint Spectrum L.P., Overland Park, KS (US)

(72) Inventor: Ahmad N. Saleh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 14/988,412

(22) Filed: Jan. 5, 2016

(51) Int. Cl.
*H04W 36/00* (2009.01)
*H04W 24/10* (2009.01)
*H04B 17/318* (2015.01)
*H04W 36/30* (2009.01)

(52) U.S. Cl.
CPC ...... *H04W 36/0083* (2013.01); *H04B 17/318* (2015.01); *H04W 24/10* (2013.01); *H04W 36/30* (2013.01)

(58) Field of Classification Search
CPC .... H04B 17/318; H04W 24/08; H04W 24/10; H04W 28/16; H04W 36/00; H04W 36/30; H04W 36/0083; H04W 92/06
See application file for complete search history.

(56) References Cited

U.S. PATENT DOCUMENTS

| | | | | |
|---|---|---|---|---|
| 7,848,776 | B2 * | 12/2010 | Akiba | H04W 52/0277 370/311 |
| 8,059,557 | B1 * | 11/2011 | Sigg | H04W 28/16 370/252 |
| 8,064,910 | B2 | 11/2011 | Lee | |
| 8,325,687 | B2 * | 12/2012 | Tinnakornsrisuphap | H04L 47/10 370/230 |
| 8,385,921 | B1 * | 2/2013 | Shousterman | H04L 45/125 455/436 |
| 8,862,144 | B2 | 10/2014 | Sayadi et al. | |
| 9,253,703 | B1 * | 2/2016 | Oroskar | H04W 36/30 |
| 9,313,766 | B2 * | 4/2016 | DiFazio | H04W 64/003 |
| 9,485,692 | B2 * | 11/2016 | Sawhney | H04W 36/0083 |
| 9,681,344 | B1 * | 6/2017 | Oroskar | H04W 36/023 |
| 9,681,350 | B1 * | 6/2017 | Marupaduga | H04W 36/24 |
| 2006/0223465 | A1 | 10/2006 | Akiba et al. | |
| 2009/0213825 | A1 * | 8/2009 | Gupta | H04W 48/02 370/338 |
| 2013/0272219 | A1 * | 10/2013 | Singh | H04W 16/14 370/329 |
| 2013/0294288 | A1 * | 11/2013 | Choi | H04L 47/745 370/254 |

(Continued)

*Primary Examiner* — Tri H Phan (57) ABSTRACT

A wireless communication device (WCD) can communicate with either a first radio access network (RAN) that uses a packet-switched network under the control of a call server for voice calls, or a second RAN that uses a circuit-switched network for voice calls. When served by the first RAN, the WCD determines whether it should be served by a relay base station of the first RAN (a base station that has a wireless backhaul to a donor base station), a non-relay base station of the first RAN, or a base station of the second RAN, by measuring a communication latency with the call server. If the latency is greater than a threshold latency for voice calls, the WCD initiates a handover to a non-relay base station (if served by a relay base station) or to a base station of the second RAN (if served by a non-relay base station).

20 Claims, 3 Drawing Sheets

(56) References Cited

U.S. PATENT DOCUMENTS

2013/0329598 A1* 12/2013 DiFazio .............. H04W 64/003
                                                    370/254
2014/0105136 A1*  4/2014 Tellado ................ H04L 5/0058
                                                    370/329
2016/0330660 A1* 11/2016 Wong ................... H04B 17/318
2017/0064579 A1*  3/2017 Park .................. H04W 28/0268

* cited by examiner

METHOD AND APPARATUS FOR LATENCY-BASED SELECTION OF SERVING BASE STATION

BACKGROUND

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the wireless network may engage in air interface communication with a base station and may thereby communicate via the base station with various remote network entities or with other WCDs served by the base station.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover between coverage areas, and other functions related to air interface communication.

A base station may communicate with WCDs over an air interface and may communicate with entities in the wireless network via a backhaul connection. The backhaul connection could be either wired or wireless. In some instances, a base station with a wireless backhaul connection may be a "relay base station" that communicates with entities in the wireless network via a wireless link to a "donor base station" in the wireless network. The relay base station uses the wireless link to relay communications between WCDs and the donor base station.

The use of relay base stations can be transparent to the WCDs. In particular, a WCD may not adjust its behavior or method of operation depending on whether the WCD is being served by a relay base station or a non-relay base station of a wireless network. In fact, the WCD may not even have information as to whether it is being served by a relay base station or a non-relay base station.

OVERVIEW

A wireless communication device (WCD) may select a serving base station based on latency. Specifically, a WCD may select a serving base station that has a sufficiently low latency to support voice calls at an acceptable level of quality. The selection process may involve the WCD initiating a handover from a relay base station to a non-relay base station, if latency is too high using the relay base station, and/or a handover from a non-relay base station to a base station to another wireless network, if latency is too high using the non-relay base station.

In one aspect, example embodiments provide a method for a WCD. The WCD determines that the WCD is being served by a relay base station of a first radio access network (RAN) that uses a packet-switched network for voice calls. A call server controls voice calls through the packet-switched network. The WCD measures a communication latency with the call server via the relay base station to obtain a relay-based latency. The WCD makes a comparison of the relay-based latency to a latency threshold for voice calls. The WCD determines whether to initiate a handover to a non-relay base station of the first RAN based on the comparison of the relay-based latency to the latency threshold for voice calls.

In another aspect, example embodiments provide a WCD comprising a wireless communication interface, a processor, data storage, and program instructions stored in the data storage. The wireless communication interface supports wireless communication with a first RAN that uses a packet-switched network for voice calls and with a second RAN that uses a circuit-switched network for voice calls. The program instructions are executable by the processor to cause the WCD to perform functions comprising: (a) when the WCD is being served by the first RAN, determining whether the WCD is being served by a relay base station or a non-relay base station of the first RAN; (b) in response to a determination that the WCD is being served by a relay base station of the first RAN, (i) measuring a communication latency with a call server via the relay base station to obtain a relay-based latency, wherein the call server controls voice calls through the packet-switched network, (ii) making a comparison of the relay-based latency to a latency threshold for voice calls, and (iii) determining whether to initiate a handover to a non-relay base station of the first RAN based on the comparison of the relay-based latency to the latency threshold for voice calls; and (c) in response to a determination that the WCD is being served by a non-relay base station of the first RAN, (i) measuring a communication latency with the call server via the non-relay base station to obtain a non-relay-based latency, (ii) making a comparison of the non-relay-based latency to the latency threshold for voice calls, and (iii) determining whether to initiate a handover to a base station of the second RAN based on the comparison of the non-relay-based latency to the latency threshold for voice calls.

DETAILED DESCRIPTION

1. Introduction

Providing wireless coverage via relay base stations can be a convenient and cost-effective way to expand the coverage areas provided by a wireless network and/or increase the capacity in existing coverage areas of a wireless network. The convenience and cost-effectiveness of relay base stations result, in part, because a relay base station uses a wireless backhaul connection to a donor base station that may have already been established in the wireless network. The wireless backhaul connection to the donor base station can, however, add latency to communications via the relay base station as compared to a communications via a non-relay base station (i.e., a base station that does not have such a wireless backhaul connection).

The additional latency associated with a relay base station can be a concern for latency-sensitive applications such as voice calls. To address this potential problem, a WCD may select a serving base station that has a latency that is sufficiently low to support voice calls at an acceptable level of quality. The WCD's selection of a serving base station based on latency may result in the WCD initiating a handover from a relay base station to a non-relay base station, if the communication latency via the relay base station is too high, and/or the WCD initiating a handover from a non-relay base station to the base station of another wireless network, if the communication latency via the non-relay base station is too high.

In example embodiments, a WCD selects a serving base station based on latency when the WCD is being served by a RAN that uses a packet-switched network for voice calls. A call server may control voice calls through the packet-switched network. For example, the RAN could be an LTE network and may use the packet-switched network for voice-over-LTE (VoLTE) calls. The call server may be an IP Multimedia Subsystem (IMS) server. Latency may be a particular concern for such packet-based voice calls.

When the WCD is being served by a RAN that uses a packet-switched network for voice calls, the WCD may determine whether it is being served by a relay base station or a non-relay base station, and the WCD measures a communication latency with the call server via its serving base station, for example, by using a ping application. To determine whether the communication latency is too high, the WCD may compare the measured latency to a predefined latency threshold for voice calls. The WCD may then determine whether to initiate a handover based on the comparison. If the measured latency is less than or equal to the latency threshold for voice calls, the WCD may determine not to initiate a handover to another base station. If the measured latency is greater than the latency for voice calls, the WCD may initiate a handover from a relay base station to a non-relay base station (if the WCD determined that it is being served by a relay base station) or from a non-relay base station to a base station of a RAN that uses a circuit-switched network for voice calls (if the WCD determined that it is being served by a non-relay base station).

In this way, a WCD may be able to select a serving base station that has a sufficiently low latency to support voice calls at an acceptable level of quality.

2. Example Network Architecture

Figure 1:
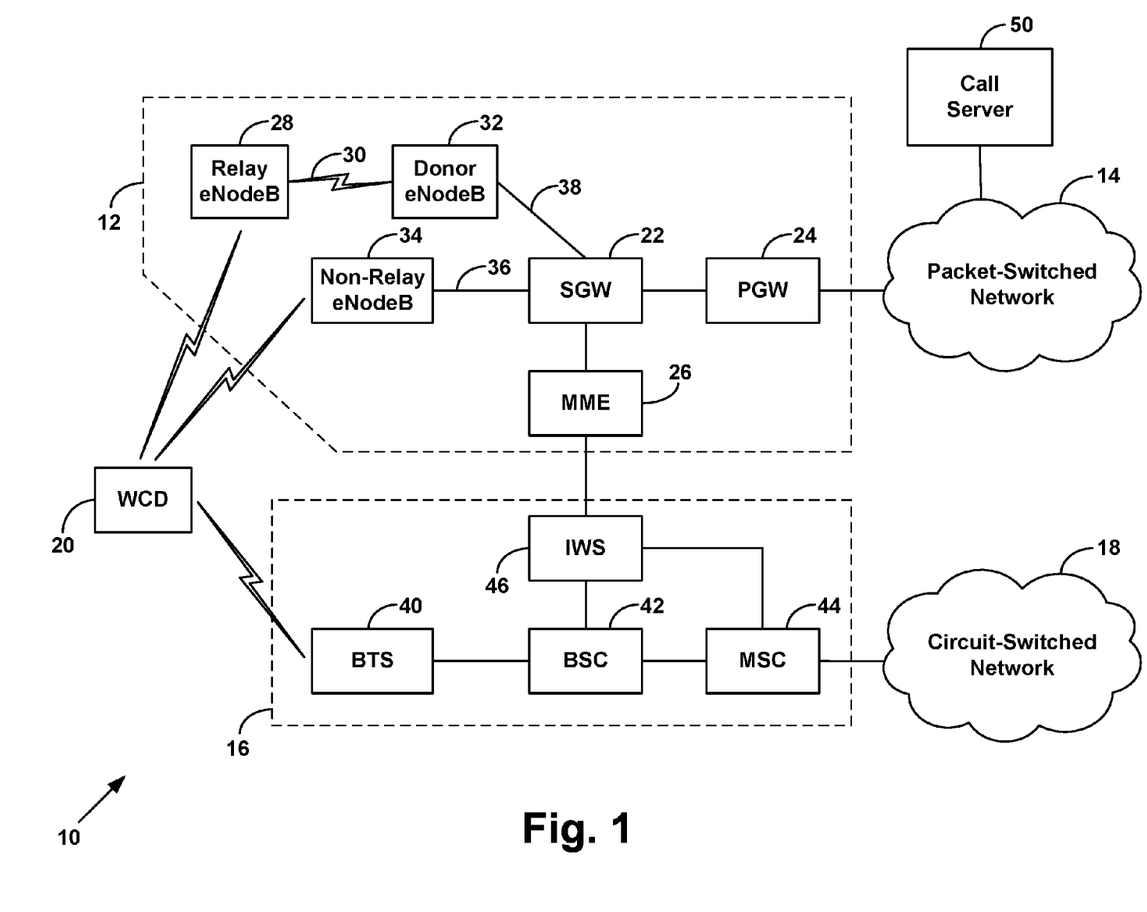
FIG. 1 is a simplified block diagram of an example wireless communication system in which embodiments of the present disclosure can be implemented.

FIG. 1 illustrates an example wireless communication system 10 in which example embodiments can be implemented. In this example, the wireless communication system 10 includes a first RAN 12 that provides access to a packet-switched network 14 and a second RAN 16 that provides access to a circuit-switched network 18. First RAN 12 and second RAN 16 provide wireless communication services to WCDs, exemplified in FIG. 1 by WCD 20. The wireless communication services provided by first RAN 12 and second RAN 16 can include voice calls, as well as the communication of data, text, video, or other media.

For purposes of illustration, first RAN 12 is shown in FIG. 1 as an LTE network and second RAN 16 is shown as a CDMA network. It is to be understood, however, that other air interface protocols and/or network configurations could be used. As an LTE network, first RAN 12 includes one or more base stations that may be referred to as eNodeBs. The eNodeBs communicate with a serving gateway (SGW) 22, which in turn has a communication interface with a packet-data network gateway (PGW) 24 that provides connectivity with packet-switched network 14. As an LTE network, first RAN 12 also includes a mobility management entity (MME) 26 that functions as a signaling controller for the LTE network. The MME 26 has a communication interface with the SGW 22.

The base stations in first RAN 12 can include relay base stations and non-relay base stations. A relay base station is a base station that has a wireless backhaul connection to another base station, referred to as a donor base station. The wireless backhaul connection could be provided by a WCD acting as a relay. A non-relay base station is a base station that does not have a wireless backhaul connection to another base station.

In the example shown in FIG. 1, first RAN 12 includes a relay base station (Relay eNodeB 28) that has a wireless backhaul connection 30 to a donor base station (Donor eNodeB 32) and a non-relay base station (Non-Relay eNobeB 34) that has a wireline backhaul connection 36 to SGW 22. In this example, Donor eNodeB 32 is also a non-relay base station because it is has a wireline backhaul connection 38 to SGW 22.

As a CDMA network, second RAN 16 includes one or more base stations, exemplified in FIG. 1 by base transceiver station (BTS) 40. The one or more base stations are connected to a base station controller (BSC) 42, which is connected to a mobile switching center (MSC) 44 that provides connectivity to circuit-switched network 18. BSC 42 could also be connected to a packet data serving node (not shown) that provides connectivity to packet-switched network 14. In this example, second RAN 16 also includes an interworking server (IWS) that provides a signaling connection to first RAN 14, for example, to support handovers between first RAN 14 and second RAN 16. IWS 46 could have communication interfaces with BSC 42, MSC 44, and MME 26.

The base stations in first RAN 12 and second RAN 16 may each radiate to define respective wireless coverage areas, such as cells or sectors, for wireless communications with WCDs, such as WCD 20. The wireless coverage areas could be overlapping. As a result, a WCD operating in an area of overlapping wireless coverage could be served by one or more base stations in first RAN 12 and/or by one or more base stations in second RAN 16. In the example shown in FIG. 1, WCD 20 is operating in area in which the wireless coverage provided by Relay eNodeB 28, Non-Relay eNbodeB 34, and BTS 40 overlap. Thus, WCD 20 could be served by any of Relay eNodeB 28, Non-Relay eNbodeB 34, and BTS 40. In that case, WCD 20 may determine which of these base stations should be its serving base station based on one or more latency measurements, as discussed below.

First RAN 12 and second RAN 16 can each support voice calls to WCDs, such as WCD 20. The voice calls supported by first RAN 12 are established through the packet-switched network 14 under a control of call server 50. Call server 50 could be, for example, part of an IP Multimedia Subsystem (IMS) network. The voice data in such voice calls is transmitted in the form of packets. For example, the voice calls could be in a voice-over-Internet-Protocol (VoIP) format. More particularly, with first RAN 12 being an LTE network, the voice calls can be voice-over-LTE (VoLTE) calls. Because of their packetized format, the perceived acceptability of voice calls supported by first RAN 12 can be affected by the latency of packet communications through first RAN 12 and packet-switched network 14. In contrast, the voice calls supported by second RAN 16 are established through circuit-switched network 18. For example, a voice call may be carried by dedicated circuits in circuit-switched network 18. Because of this difference, a voice call may have a higher latency if first RAN 12 is used for the call than if second RAN 14 is used for the call.

Within first RAN 12, the latency of a voice call can also be affected by the type of base station that is used for the call. In particular, a relay base station may have a higher latency than a non-relay base station because of the wireless backhaul connection to the donor base station. Thus, in the example shown in FIG. 1, in which WCD 20 can be served by Relay eNodeB 28, Non-Relay eNodeB 34, or BTS 40, a voice call involving WCD 20 may experience the highest latency when WCD 20 is served by Relay eNodeB 28, may experience a somewhat lower latency when served WCD 20 is served by Non-Relay eNodeB 34, and may experience the lowest latency when WCD 20 is served by BTS 40.

3. Example Method

Figure 2:
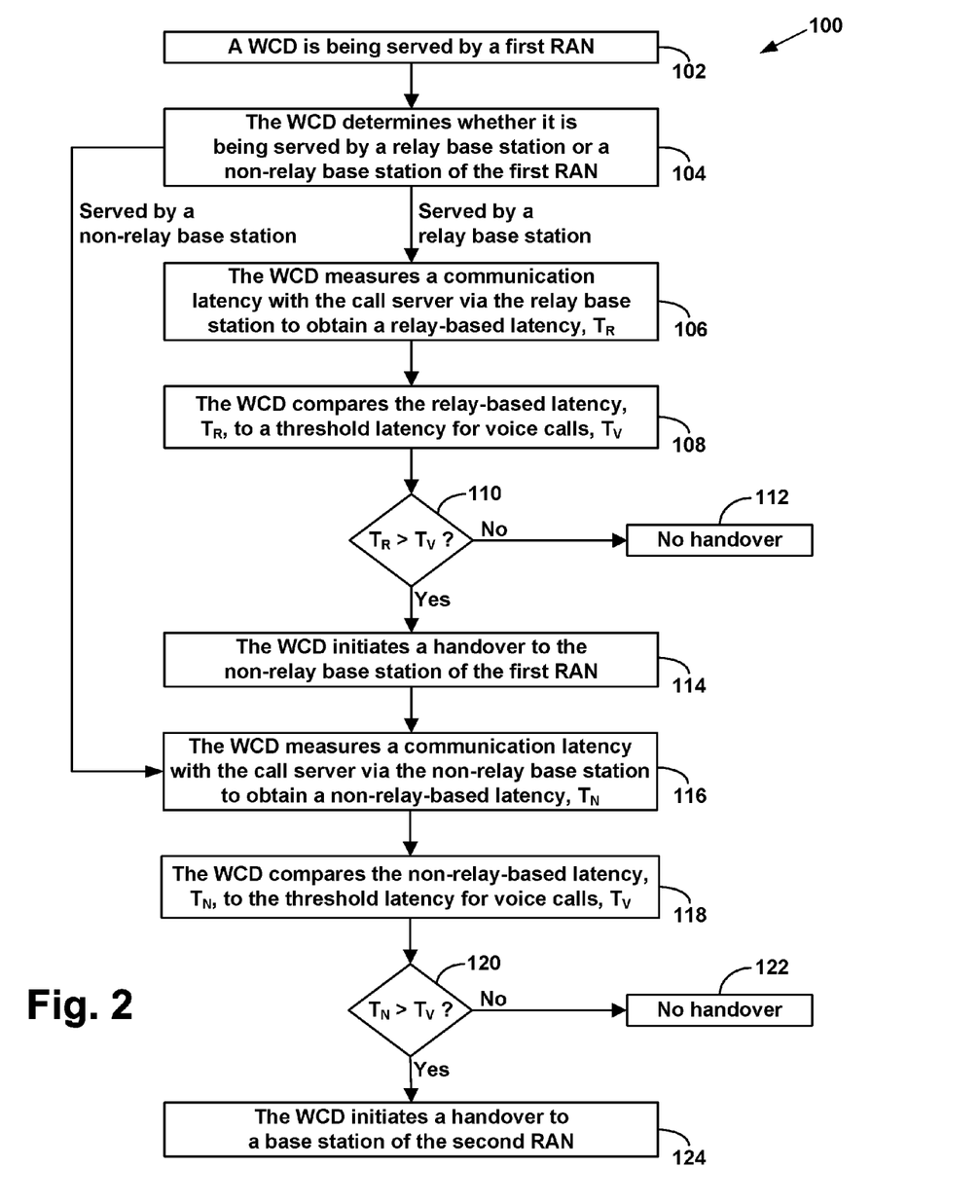
FIG. 2 is a flow chart illustrating an example method for selecting a serving base station based on latency.

FIG. 2 is a flow chart illustrating an example method 100 in which a WCD selects a serving base station based on latency. For purposes of illustration, example method 100 is described with reference to the example wireless communication system 10 shown in FIG. 1, in which first RAN 12 is an LTE network and second RAN 16 is a CDMA network. It is to be understood, however, that other air interface protocols and/or network configurations could be used.

Method 100 begins with a WCD (e.g., WCD 20) being served by a first RAN, as indicated by block 102. The first RAN uses a packet-switched network for voice calls, under the control of a call server (e.g., call server 50). For example, the first RAN could be an LTE network and could use the packet-switched network for VoLTE calls. In this example, the WCD is able engage in a voice call (e.g., a VoLTE call) via the first RAN and packet-switched network. The WCD is also able to engage in a voice call via a second RAN (e.g., a CDMA network) that uses a circuit-switched network for voice calls.

The WCD determines whether it is being served by a relay base station (e.g., Relay eNodeB 28) or a non-relay base station (e.g., Non-Relay eNodeB 34) of the first RAN, as indicated by block 104. In some implementations, the WCD may make this determination whenever it establishes a radio connection with a base station of the first RAN. Alternatively, the WCD may make this determination in response to some other trigger, for example, when the WCD receives a request from the user to originate a voice call or when the WCD receives an indication from the first RAN of an incoming voice call to the WCD.

The WCD's determination can be facilitated by assigning identifiers of base stations in the first RAN, such that a base station's identifier indicates whether the base station is a relay base stations or a non-relay base station. The identifiers could be, for example, Physical Cell Identities (PCIs). In one approach, a first range of identifiers may be used for relay base stations and a second range of identifiers may be used for non-relay base stations. In that case, the WCD can receive a message from the first RAN that includes the identifier of the base station serving the WCD, and the WCD can determine whether the identifier is within the first range of identifiers corresponding to relay base stations or within the second range of identifiers corresponding to non-relay base stations. In another approach, relay base stations may be assigned odd-number identifiers and non-relay base stations may be assigned even-number identifiers. Other examples are possible as well.

How method 100 proceeds depends on whether the WCD is being served by a relay base station or a non-relay base station. If WCD determines that it is being served by a non-relay base station, then method proceeds to block 116 (which is discussed below).

If the WCD determines that it is being served by a relay base station, then the WCD measures a communication latency with the call server via the relay base station to obtain a relay-based latency, $T_R$, as indicated by block 106. The WCD can measure the communication latency by using a ping application, such as provided by the Internet Control Message Protocol (ICMP), to measure a roundtrip packet latency with the call server.

The WCD then compares the relay-based latency, $T_R$, to a threshold latency for voice calls, $T_V$, as indicated by block 108. The threshold latency for voice calls could be a maximum latency that is deemed acceptable for voice calls. For example, the threshold latency for voice calls could be 100 milliseconds. The WCD could obtain the value of $T_V$ in various ways. For example, the value of $T_V$ could be provisioned in the WCD. Alternatively, the WCD may receive the value of $T_V$ from the first RAN. For example, the value of $T_V$ could be included in a System Information Block (SIB) broadcast from the base station serving the WCD.

The WCD determines whether to initiate a handover to a non-relay base station of the first RAN (e.g., Non-Relay eNodeB 34) based on the comparison of the relay-based latency, $T_R$, to a threshold latency for voice calls, $T_V$. In this example, the WCD determines whether to initiate a handover based on whether $T_R$ is greater than $T_V$, as indicated by block 110.

If $T_R$ is less than or equal to $T_V$, then the WCD does not initiate a handover, as indicated by block 112. In that case, the WCD continues being served by the relay base station of the first RAN. As a result, the WCD may become engaged in a voice call via the relay base station. Because the relay-based latency, $T_R$, was found to not exceed the threshold latency for voice calls, $T_V$, the relay base station may be expected to support the voice call with an acceptable level of quality.

If $T_R$ is greater than $T_V$, then the WCD initiates a handover to the non-relay base station of the first RAN, as indicated by block 114. To initiate the handover, the WCD may transmit a measurement report to the relay base station. The measurement report may include a signal strength of the relay base station that is sufficiently low (e.g., below a first threshold), so as to indicate that a handover away from the relay base station is warranted, and a signal strength of the non-relay base station that is sufficiently high (e.g., above a second threshold), so as to indicate that a handover to the non-relay base station is warranted.

To prepare the measurement report, the WCD may measure a signal strength of the relay base station and a signal strength of the non-relay base station. If the signal strength of the relay base station is sufficiently low (e.g., below the first threshold), then the WCD may include the measured signal strength of the relay base station in the measurement report. Otherwise, the WCD may include a purported signal strength of the relay base station instead of the measured signal strength of the relay base station. The purported signal strength of the relay base station is a preset value that is sufficiently low (e.g., below the first threshold) to indicate that a hancover is warranted. Similarly, the WCD may include the measured signal strength of the non-relay base station in the measurement report, if the measured signal strength of the non-relay base station is sufficiently high (e.g., above the second threshold). Otherwise, the WCD may include a purported signal strength of the non-relay base station instead of the measured signal strength of the non-relay base station. The purported signal strength of the non-relay base station is a value that is sufficiently high (e.g., above the second threshold) to indicate that a handover is warranted. Alternatively, the WCD may transmit a measurement report that includes the purported signal strengths of the relay base station and non-relay base station (i.e., preset values), without measuring signal strengths.

As indicated by block 116, the WCD may measure a communication latency with the call server via the non-relay base station to obtain a non-relay-based latency, $T_N$. The WCD may perform this latency measurement after completing a handover from a relay base station to the non-relay base station, as discussed above for block 114. Alternatively, the WCD may perform this latency measurement without a handover, for example, in response to determining in block 104 that the WCD is being served by a non-relay base station. To measure the communication latency, the WCD may use a ping application to measure a roundtrip packet latency with the call server, as discussed above.

The WCD then compares the non-relay-based latency, $T_N$, to the threshold latency for voice calls, $T_V$, as indicated by block 118. The WCD determines whether to initiate a handover to a base station of the second RAN (e.g., BTS 40) based on the comparison of the relay-based latency, $T_N$, to a threshold latency for voice calls, $T_V$. In this example, the WCD determines whether to initiate a handover based on whether $T_N$ is greater than $T_V$, as indicated by block 120.

If $T_N$ is less than or equal to $T_V$, then the WCD does not initiate a handover, as indicated by block 122. In that case, the WCD continues being served by the non-relay base station of the first RAN. As a result, the WCD may become engaged in a voice call via the relay base station. Because the non-relay-based latency, $T_N$, was found to not exceed the threshold latency for voice calls, $T_V$, the non-relay base station may be expected to support the voice call with an acceptable level of quality.

If $T_N$ is greater than $T_V$, then the WCD initiates a handover to the non-relay base station of the first RAN, as indicated by block 124. To initiate the handover, the WCD may transmit a measurement report to the non-relay base station. The measurement report may include a signal strength of the non-relay base station that is sufficiently low (e.g., below a first threshold), so as to indicate that a handover away from the relay base station is warranted, and a signal strength of the base station of the second RAN that is sufficiently high (e.g., above a second threshold), so as to indicate that a handover to the base station of the second RAN is warranted. The signal strengths in the measurement report could be signal strengths of the non-relay base station and/or second RAN base station that have been actually measured by the WCD. Alternatively, one or both of the signal strengths could be purported signal strengths, e.g., preset values that are sufficiently high or sufficiently low to indicate that a handover is warranted.

In yet another approach, the WCD may release its radio connection with the first RAN without transmitting a measurement report. After releasing the radio connection with the first RAN, the WCD may then seek a radio connection with the second RAN so as to effect a handover from the first RAN to the second RAN.

After the handover to the base station of the second RAN, the WCD may become engaged in a voice call via the second RAN. In that case, the voice call would go through circuit-switched network 18. As a result, latency may be sufficiently low that the second RAN would be expected to support the voice call with an acceptable level of quality.

4. Example WCD

Figure 3:
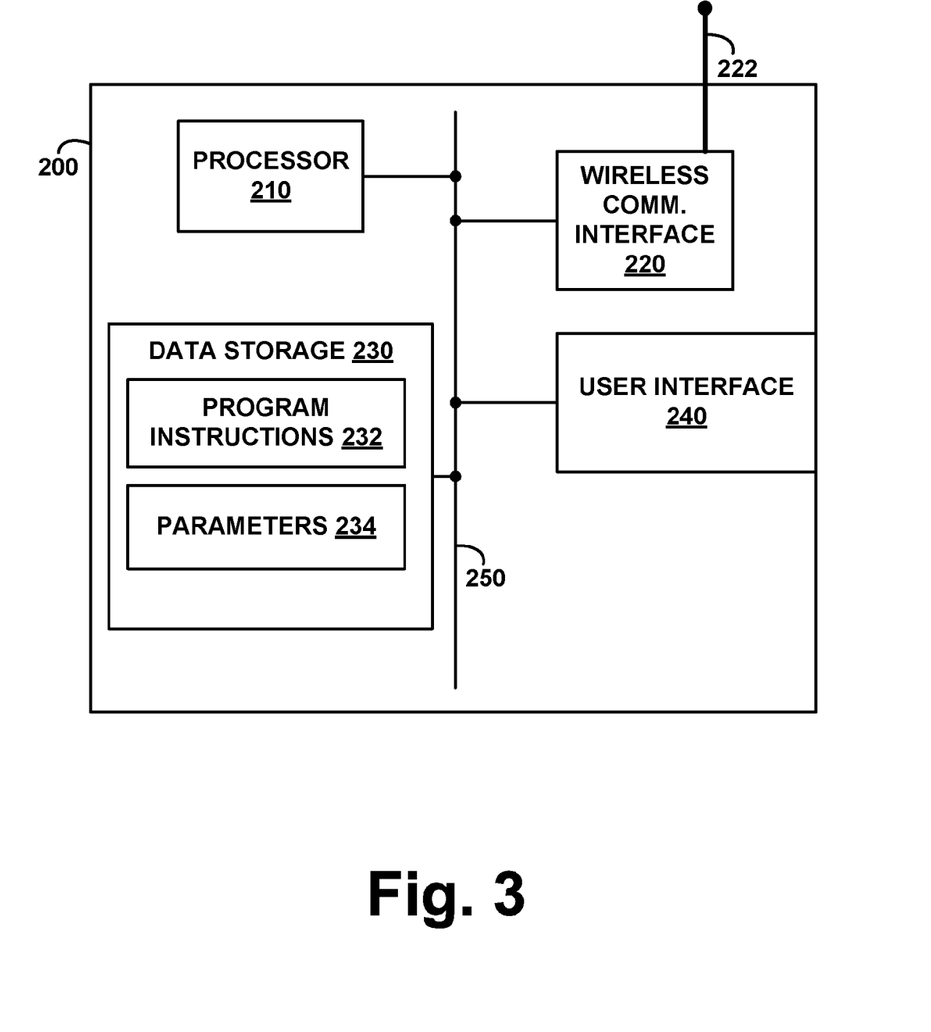
FIG. 3 is simplified block diagram of an example WCD, in accordance with the present disclosure.

FIG. 3 is a simplified block diagram of a WCD 200 that could operate in accordance with the methods described in this disclosure. WCD 200 could be, for example, a cellular telephone, a wirelessly equipped computing device, or other wireless communication device. As illustrated, WCD 200 may include a processor 210, a wireless communication interface 220, antenna 222, data storage 230, and a user interface 240, all coupled by a system bus 250.

Processor 210 could be, for example, a general purpose microprocessor and/or a discrete signal processor. Though processor 210 is described here as a single processor, those having skill in the art will recognize that WCD 200 may contain multiple processors.

Wireless communication interface 220 may support wireless communication with various wireless networks via antenna 222. In an example embodiment, wireless communication interface 220 supports wireless communication with an LTE network (e.g., first RAN 12) and with a CDMA network (e.g., second RAN 16). In other examples, wireless communication interface 220 could support wireless communication with other types of wireless networks.

Data storage 230 could be any form of non-transitory computer readable medium, such as volatile memory, non-volatile memory, one or more magnetically encoded disks, and/or one or more optically encoded disks. Data storage 230 may store program instructions 232 that are executable by processor 210 to carry out one or more of the functions described herein. In addition, data storage 230 may store parameters 234 in connection with carrying out the functions described herein. The parameters 234 could include, for example, a threshold latency for voice calls ($T_V$), a relay-based latency ($T_R$) that WCD 200 measured via a relay base station, and/or a non-relay-based latency ($T_N$) that the WCD 200 measured via a non-relay base station. The parameters 234 could also specify a range of identifiers (e.g., PCIs) that correspond to relay base stations of the first RAN and a range of identifiers that correspond to non-relay base stations of the first RAN.

User interface 240 could include one or more input devices (e.g., a touchscreen, a keypad, buttons, camera, microphone, etc.) that can receive input from a user of WCD 200. The input from the user could control the operation of WCD 200 and/or provide voice, textual, or other data that WCD 200 could store or transmit via the wireless communication interface 220. User interface 240 could also include one or more output devices (e.g., a display, a speaker, etc.) that can convey voice, textual, graphical, or video output to the user of WCD 200.

WCD 200 is able to use wireless communication interface 220 to originate and receive voice calls, such as VoLTE calls. To provide a sufficiently low latency for voice calls, the WCD 200 may select a serving base station based on latency. In an example embodiment, the processor 210 may execute the program instructions 232 to perform the following functions related to selecting a serving base station: (a) when the WCD is being served by the first RAN, determining whether the WCD is being served by a relay base station or a non-relay base station of the first RAN; (b) in response to a determination that the WCD is being served by a relay base station of the first RAN, (i) measuring a communication latency with a call server via the relay base station to obtain a relay-based latency, wherein call server controls voice calls through the packet-switched network, (ii) making a comparison of the relay-based latency to a latency threshold for voice calls, and (iii) determining whether to initiate a handover to a non-relay base station of the first RAN based on the comparison of the relay-based latency to the latency threshold for voice calls; and (c) in response to a determination that the WCD is being served by a non-relay base station of the first RAN, (i) measuring a communication latency with the call server via the non-relay base station to obtain a non-relay-based latency, (ii) making a comparison of the non-relay-based latency to the latency threshold for voice calls, and (iii) determining whether to initiate a handover to a base station of the second RAN based on the comparison of the non-relay-based latency to the latency threshold for voice calls.

Determining whether the WCD is being served by a relay base station or a non-relay base station of the first RAN may involve: (i) receiving a message from the first RAN that includes an identifier (e.g., a PCI) of a base station serving the WCD; and (ii) determining whether the identifier is within a first range of identifiers corresponding to relay base stations of the first RAN or within a second range of identifiers corresponding to non-relay base stations of the first RAN.

Determining whether to initiate a handover to a non-relay base station of the first RAN based on the comparison of the relay-based latency to the latency threshold for voice calls may involve: (i) if the relay-based latency is less than the latency threshold for voice calls, determining not to initiate a handover to the non-relay base station; and (ii) if the relay-based latency is greater than the latency threshold for voice calls, determining to initiate a handover to the non-relay base station.

Determining whether to initiate a handover to a base station of the second RAN based on the comparison of the non-relay-based latency to the threshold latency for voice calls may involve: (i) if the non-relay-based latency is less than the latency threshold for voice calls, determining not to initiate a handover to the base station of the second RAN; and (ii) if the non-relay-based latency is greater than the latency threshold for voice calls, determining to initiate a handover to the base station of the second RAN.

Measuring a communication latency with the call server via the relay base station or non-relay base station may involve using a ping application to measure a roundtrip packet delay with the call server.

The functions may further include receiving, via wireless communication interface 220, an indication of the threshold latency for voice calls, $T_V$, from either the relay base station or non-relay base station. The threshold latency could be, for example, included in a System Information Block (SIB) broadcast by the base station. The WCD 200 may then store the value of $T_V$ in data storage 230.

Exemplary embodiments have been described above. Those skilled in the art will understand, however, that changes and modifications may be made to these embodiments without departing from the true scope and spirit of the invention.

What is claimed is:

1. A method for a wireless communication device (WCD), comprising:
the WCD determining whether the WCD is being served by a relay base station or a non-relay base station of a first radio access network (RAN), wherein the first RAN uses a packet-switched network for voice calls, and wherein a call server controls voice calls through the packet-switched network;

in response to a determination that the WCD is being served by a relay base station of the first RAN, the WCD measuring a communication latency with the call server via the relay base station to obtain a relay-based latency;

the WCD making a comparison of the relay-based latency to a latency threshold for voice calls; and the WCD determining whether to initiate a handover to a non-relay base station of the first RAN based on the comparison of the relay-based latency to the latency threshold for voice calls.

2. The method of claim 1, wherein the relay base station has a wireless backhaul connection to a donor base station of the first RAN.

3. The method of claim 2, wherein the non-relay base station does not have a wireless backhaul connection.

4. The method of claim 1, wherein the WCD measuring a communication latency with a call server via the relay base station comprises the WCD using a ping application to measure a roundtrip packet latency with the call server.

5. The method of claim 1, wherein the WCD determining whether to initiate a handover to a non-relay base station of the first RAN based on the comparison of the relay-based latency to the latency threshold for voice calls comprises:
if the relay-based latency is less than the latency threshold for voice calls, the WCD determining not to initiate a handover to the non-relay base station; and
if the relay-based latency is greater than the latency threshold for voice calls, the WCD determining to initiate a handover to the non-relay base station.

6. The method of claim 5, further comprising:
the WCD determining not to initiate a handover to the non-relay base station, based on the relay-based latency being less than the latency threshold for voice calls; and
the WCD becoming engaged in a voice call via the relay base station, wherein the voice call is established through the packet-switched network.

7. The method of claim 5, further comprising:
the WCD initiating a handover to the non-relay base station, based on the relay-based latency being greater than the latency threshold for voice calls.

8. The method of claim 7, wherein the WCD initiating a handover to the non-relay base station comprises:
the WCD measuring a signal strength of the relay base station and a signal strength of the non-relay base station; and
the WCD transmitting a measurement report to the relay base station, wherein the measurement report includes a purported signal strength of the relay base station and a purported signal strength of the non-relay base station, and wherein the purported signal strength of the relay base station is less than the measured signal strength of the relay base station and/or the purported signal strength of the non-relay base station is greater than the measured signal strength of the non-relay base station.

9. The method of claim 7, further comprising:
after the handover to the non-relay base station, the WCD measuring a communication latency with the call server via the non-relay base station to obtain a non-relay-based latency;
the WCD making a comparison of the non-relay-based latency to the latency threshold for voice calls; and
the WCD determining whether to initiate a handover to a base station of a second RAN based on the comparison of the non-relay-based latency to the latency threshold for voice calls, wherein the second RAN uses a circuit-switched network for voice calls.

10. The method of claim 9, wherein the WCD determining whether to initiate a handover to a base station of a second RAN based on the comparison of the non-relay-based latency to the latency threshold for voice calls comprises:
if the non-relay-based latency is less than the latency threshold for voice calls, the WCD determining not to initiate a handover to the base station of the second RAN; and
if the non-relay-based latency is greater than the latency threshold for voice calls, the WCD determining to initiate a handover to the base station of the second RAN.

11. The method of claim 10, further comprising:
the WCD determining not to initiate a handover to the base station of the second RAN, based on the non-relay-based latency being less than the latency threshold for voice calls; and
the WCD becoming engaged in a voice call via the non-relay base station, wherein the voice call is established through the packet-switched network.

12. The method of claim 10, further comprising:
the WCD initiating a handover to the base station of the second RAN, based on the non-relay-based latency being greater than the latency threshold for voice calls; and
the WCD becoming engaged in a voice call via the base station of the second RAN, wherein the voice call is established through the circuit-switched network.

13. The method of claim 12, wherein the WCD initiating a handover to the base station of the second RAN comprises:
the WCD measuring a signal strength of the non-relay base station and a signal strength of the base station of the second RAN; and
the WCD transmitting a measurement report to the non-relay base station, wherein the measurement report includes a purported signal strength of the non-relay base station and a purported signal strength of the base station of the second RAN, and wherein the purported signal strength of the non-relay base station is less than the measured signal strength of the non-relay base station and/or the purported signal strength of the base station of the second RAN is greater than the measured signal strength of the base station of the second RAN.

14. The method of claim 9, wherein the first RAN is a Long-Term Evolution (LTE) network and the second RAN is a Code Division Multiple Access (CDMA) network.

15. The method of claim 1, further comprising:
the WCD receiving an indication of the threshold latency for voice calls from the relay base station.

16. A wireless communication device (WCD) comprising:
a wireless communication interface, wherein the wireless communication interface supports wireless communication with (i) a first radio access network (RAN) that uses a packet-switched network for voice calls, and (ii) a second RAN that uses a circuit-switched network for voice calls;
a processor;
data storage;
program instructions stored in the data storage and executable by the processor to cause the WCD to perform functions, the functions comprising:
when the WCD is being served by the first RAN, determining whether the WCD is being served by a relay base station or a non-relay base station of the first RAN;
in response to a determination that the WCD is being served by a relay base station of the first RAN, (i) measuring a communication latency with a call server via the relay base station to obtain a relay-based latency, wherein the call server controls voice calls through the packet-switched network, (ii) making a comparison of the relay-based latency to a latency threshold for voice calls, and (iii) determining whether to initiate a handover to a non-relay base station of the first RAN based on the comparison of the relay-based latency to the latency threshold for voice calls; and
in response to a determination that the WCD is being served by a non-relay base station of the first RAN, (i) measuring a communication latency with the call server via the non-relay base station to obtain a non-relay-based latency, (ii) making a comparison of the non-relay-based latency to the latency threshold for voice calls, and (iii) determining whether to initiate a handover to a base station of the second RAN based on the comparison of the non-relay-based latency to the latency threshold for voice calls.

17. The WCD of claim 16, wherein determining whether the WCD is being served by a relay base station or a non-relay base station of the first RAN comprises:
receiving a message from the first RAN that includes an identifier of a base station serving the WCD; and
determining whether the identifier is within a first range of identifiers corresponding to relay base stations of the first RAN or within a second range of identifiers corresponding to non-relay base stations of the first RAN.

18. The WCD of claim 16, wherein determining whether to initiate a handover to a non-relay base station of the first RAN based on the comparison of the relay-based latency to the latency threshold for voice calls comprises:
if the relay-based latency is less than the latency threshold for voice calls, determining not to initiate a handover to the non-relay base station; and
if the relay-based latency is greater than the latency threshold for voice calls, determining to initiate a handover to the non-relay base station.

19. The WCD of claim 16, wherein determining whether to initiate a handover to a base station of a second RAN based on the comparison of the non-relay-based latency to the latency threshold for voice calls comprises:
if the non-relay-based latency is less than the latency threshold for voice calls, determining not to initiate a handover to the base station of the second RAN; and
if the non-relay-based latency is greater than the latency threshold for voice calls, determining to initiate a handover to the base station of the second RAN.

20. The WCD of claim 16, wherein the first RAN is a Long-Term Evolution (LTE) network and the second RAN is a Code Division Multiple Access (CDMA) network.

* * * * *